(12) United States Patent
Yang

(10) Patent No.: US 9,897,178 B2
(45) Date of Patent: Feb. 20, 2018

(54) MANIPULATABLE EPICYCLIC TYPE CLUTCH DEVICE COUPLED WITH HYBRID POWER TRAIN

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 313 days.

(21) Appl. No.: 14/547,423

(22) Filed: Nov. 19, 2014

(65) Prior Publication Data
US 2015/0072820 A1   Mar. 12, 2015

Related U.S. Application Data

(62) Division of application No. 13/045,675, filed on Mar. 11, 2011, now Pat. No. 9,011,286.

(51) Int. Cl.
 *F16H 3/72* (2006.01)
 *B60K 6/445* (2007.10)
 *B60K 6/48* (2007.10)

(52) U.S. Cl.
 CPC .............. *F16H 3/721* (2013.01); *B60K 6/445* (2013.01); *B60K 6/48* (2013.01); *F16H 3/72* (2013.01); *F16H 3/724* (2013.01); *F16H 2200/2005* (2013.01); *F16H 2200/2007* (2013.01); *Y02T 10/6221* (2013.01); *Y02T 10/6239* (2013.01)

(58) Field of Classification Search
 CPC ..... B60K 2006/266; F16H 3/72; F16H 3/724; F16H 2200/2005; Y01T 10/6221; Y01T 10/6239
 See application file for complete search history.

(56) References Cited

U.S. PATENT DOCUMENTS

| | | | |
|---|---|---|---|
| 5,106,353 A | 4/1992 | Ra et al. | |
| 7,736,266 B2 | 6/2010 | Huang et al. | |
| 2001/0016532 A1* | 8/2001 | Jung | B60K 6/383 |
| | | | 475/5 |
| 2003/0078134 A1 | 4/2003 | Kojima et al. | |
| 2006/0016630 A1* | 1/2006 | Yang | B60K 7/0007 |
| | | | 180/65.1 |
| 2012/0232729 A1 | 9/2012 | Yang | |
| 2013/0157808 A1* | 6/2013 | Treichel | B60K 6/365 |
| | | | 477/15 |

* cited by examiner

Primary Examiner — Stacey A Fluhart
(74) Attorney, Agent, or Firm — Bacon & Thomas, PLLC (57) ABSTRACT

The present invention provides a controllable epicyclic type clutch device coupled with hybrid power train structured by using the controllable brake device to manipulate an epicyclic gear set (EG101), in which the power train having the clutch device structured by using the controllable brake device to manipulate the epicyclic gear set (EG101) can be widely applied in a dual rotary kinetic power source or a triple rotary kinetic power source, the structural configuration includes a coaxial in-series structure or a multiple axial in-parallel structure for satisfying the requirement of applied space.

7 Claims, 4 Drawing Sheets

MANIPULATABLE EPICYCLIC TYPE CLUTCH DEVICE COUPLED WITH HYBRID POWER TRAIN

This application is a divisional of U.S. patent application Ser. No. 13/045,675, filed Mar. 11, 2011, and incorporated by reference herein.

BACKGROUND OF THE INVENTION (a) Field of the Invention

The present invention is through an epicyclic gear set (EG101) and a controllable brake device to structure the clutch function, so as to replace the conventional friction type electromagnetic clutch device, and combined with two or more than two of one or more than one types of rotary kinetic power sources to constitute a controllable epicyclic type clutch device coupled with hybrid power train.

(b) Description of the Prior Art

A friction type electromagnetic clutch device is often installed between conventional automatic or semi-automatic power trains or hybrid power trains for performing engagement or disengagement, so that the power train is enabled to perform various functional operations; however, when the friction type electromagnetic clutch device is in a disengaged state, residual torque may remain, and thereby to cause power loss and system malfunction.

SUMMARY OF THE INVENTION

The present invention provides a controllable epicyclic type clutch device coupled with hybrid power train structured by using the controllable brake device to manipulate an epicyclic gear set (EG101), in which the power train having the clutch device structured by using the controllable brake device to manipulate the epicyclic gear set (EG101) can be widely applied in a dual rotary kinetic power source or a triple rotary kinetic power source, the structural configuration includes a coaxial in-series structure or a multiple axial in-parallel structure for satisfying the requirement of applied space.

BRIEF DESCRIPTION OF THE DRAWINGS

FIG. 5 is a schematic structural view showing the present invention being structured by the first rotary kinetic power source (P1) and a transmission unit (T200) and the epicyclic gear set (EG101) and a controllable brake device (BK102), and the output wheel (W102) of the epicyclic gear set (EG101) and the output/input end of the rotation shaft (S102) being combined with the second rotary kinetic power source (P2), the epicyclic wheel (W103) of the epicyclic gear set (EG101) being provided for driving the rocker arm (A101) and the sleeve type rotation shaft (AS101), and the sleeve type rotation shaft (AS101) being provided for driving the output/input end rotation shaft (S1031) of the transmission unit (T200), and the other output/input end rotation shaft (S1032) of the transmission unit (T200) being installed with a rotation shaft (S110), according to one embodiment of the present invention.

FIG. 6 is a schematic view showing the structure in FIG. 5 in which the input wheel (W101) of the epicyclic gear set (EG101) being combined with the rotation shaft (S101) and combined with the rotation shaft (S1011) of the first rotary kinetic power source (P1), the rotation shaft (S101) being combined to an action side of a controllable brake device (BK103), and the other action end of the controllable brake device (BK103) being fixed in the housing (H100), a planetary gear set (300) being installed between the rotation shaft (S102) combined with the output wheel (W102) of the epicyclic gear set (EG101) and the second rotary kinetic power source (P2), the output/input end of the rotation shaft (S102) combined with the output wheel (W102) of the epicyclic gear set (EG101) being combined with a rocker arm (A111) of a planetary gear set (T300), an outer annular wheel (W113) of the planetary gear set (T300) being fixed in the housing (H100), a sun wheel (W111) of the planetary gear set (T300) being combined with the second rotary kinetic power source (P2), the epicyclic wheel (W103) of the epicyclic gear set (EG101) being provided for driving the rocker arm (A101) and the sleeve type rotation shaft (AS101), and the sleeve type rotation shaft (AS101) being provided for driving the output/input end rotation shaft (S1031) of the transmission unit (T200), according to one embodiment of the present invention.

DESCRIPTION OF MAIN COMPONENT SYMBOLS

A101、A111、A201: Rocker arm
AS101、AS201: Sleeve type rotation shaft
BK101、BK102、BK103、BK104: Controllable brake device
EG101、EG201: Epicyclic gear set
H100: Housing
P1: First rotary kinetic power source
P2: Second rotary kinetic power source
P3: Third rotary kinetic power source
S101、S102、S110、S201、S202、S1011、S1012、S1013、S1024、S1025、S1026、S1031、S1032、S1051、S1052: Rotation shaft
T1: First transmission device
T200: Transmission unit
T300: Planetary gear set
W101、W201: Input wheel
W102、W202: Output wheel
W103、W203: Epicyclic wheel
W111: Sun wheel
W112: Planetary wheel
W113: Outer annular wheel

DETAILED DESCRIPTION OF THE PREFERRED EMBODIMENTS

A friction type electromagnetic clutch device is often installed between conventional automatic or semi-automatic power trains or hybrid power trains for performing engagement or disengagement, so that the power train is enabled to perform various functional operations; however, when the friction type electromagnetic clutch device is in a disengaged state, residual torque may remain, and thereby to cause power loss and system malfunction.

The present invention is through an epicyclic gear set (EG101) and a controllable brake device to structure the clutch function, so as to replace the conventional friction type electromagnetic clutch device, and combined with two or more than two of one or more than one types of rotary kinetic power sources to constitute a controllable epicyclic type clutch device coupled with hybrid power train.

The present invention provides a controllable epicyclic type clutch device coupled with hybrid power train structured by using the controllable brake device to manipulate an epicyclic gear set (EG101), in which the power train having the clutch device structured by using the controllable brake device to manipulate the epicyclic gear set (EG101) can be widely applied in a dual rotary kinetic power source or a triple rotary kinetic power source, the structural configuration includes a coaxial in-series structure or a multiple axial in-parallel structure for satisfying the requirement of applied space.

Figure 1:
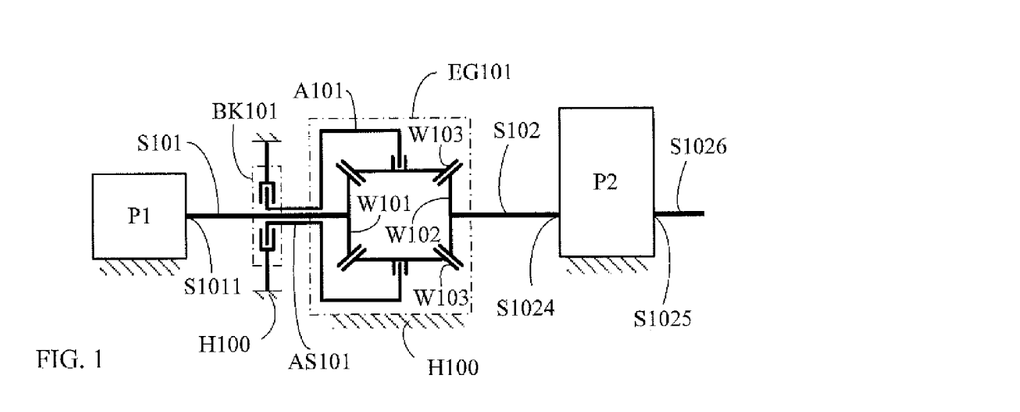
FIG. 1 is a schematic structural view showing a rocker arm (A101) and a sleeve type rotation shaft (AS101) driven by a first rotary kinetic power source (P1) and an epicyclic wheel (W103) of an epicyclic gear set (EG101) being combined with a controllable brake device (BK101), and an input wheel (W102) of the epicyclic gear set (EG101) and an output/input end of a rotation shaft (S102) being combined with a second rotary kinetic power source (P2) and an output/input end rotation shaft (S1026), according to one embodiment of the present invention.

The structures and embodiments of the controllable epicyclic type clutch device coupled with hybrid power train are as followings:

FIG. 1 is a schematic structural view showing a rocker arm (A101) and a sleeve type rotation shaft (AS101) driven by a first rotary kinetic power source (P1) and an epicyclic wheel (W103) of an epicyclic gear set (EG101) being combined with a controllable brake device (BK101), and an input wheel (W102) of the epicyclic gear set (EG101) and an output/input end of a rotation shaft (S102) being combined with a second rotary kinetic power source (P2) and an output/input end rotation shaft (S1026), according to one embodiment of the present invention.

As shown in FIG. 1, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

One end of the rotation shaft (S101) is combined with the input wheel (W101) of the epicyclic gear set (EG101), the other end of the rotation shaft (S101) is combined with an output/input end rotation shaft (S1011) of the first rotary kinetic power source (P1), and the rotation shaft (S102) combined with the output wheel (W102) of the epicyclic gear set (EG101) is served as an output/input end for being combined with an output/input end rotation shaft (S1024) of the second rotary kinetic power source (P2), and the other output/input end rotation shaft (S1025) of the second rotary kinetic power source (P2) is combined with a rotation shaft (S1026) for being served as an output/input end;

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing between the rotation shaft (S101) and the rotation shaft (S102) are enabled to be controlled, so as to further control the operation relation between the first rotary kinetic power source (P1), the second rotary kinetic power source (P2) and the rotation shaft (S1026); for example controlling one or both of the first rotary kinetic power source (P1) and the second rotary kinetic power source (P2) to drive the rotation shaft (S1026).

Figure 2:
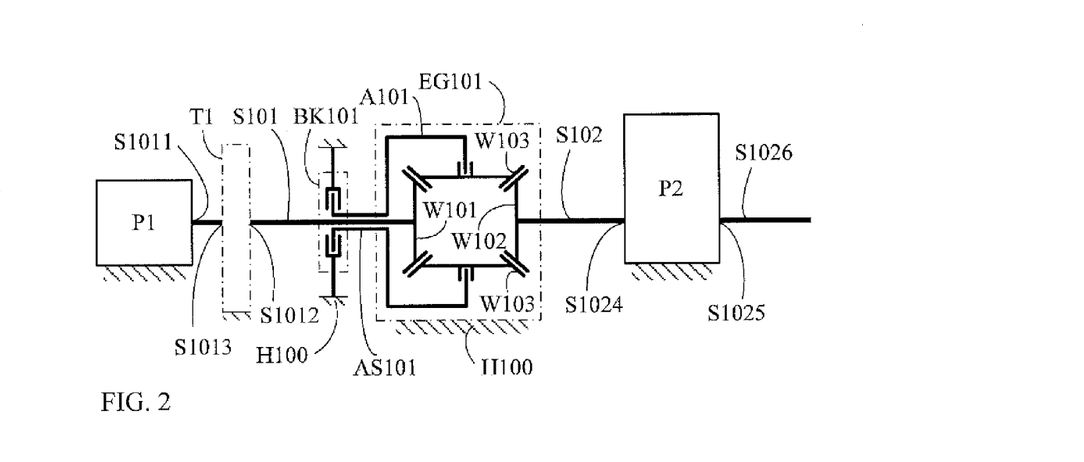
FIG. 2 is a schematic view showing a first transmission device (T1) being installed between the first rotary kinetic power source (P1) and the controllable brake device (BK101), and the input wheel (W102) of the epicyclic gear set (EG101) and the output/input end of the rotation shaft (S102) being combined with the second rotary kinetic power source (P2) and the output/input end rotation shaft (S1026) shown in FIG. 1, according to one embodiment of the present invention.

FIG. 2 is a schematic view showing a first transmission device (T1) being installed between the first rotary kinetic power source (P1) and the controllable brake device (BK101), and the input wheel (W102) of the epicyclic gear set (EG101) and the output/input end of the rotation shaft (S102) being combined with the second rotary kinetic power source (P2) and the output/input end rotation shaft (S1026) shown in FIG. 1, according to one embodiment of the present invention.

As shown in FIG. 2, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

First transmission device (T1): which is constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

The other end of the rotation shaft (S101) combined with the input wheel (W101) of the epicyclic gear set (EG101) is combined with the output/input end rotation shaft (S1012) of the first transmission device (T1), and the output/input end rotation shaft (S1013) at the other end of the first transmission device (T1) is combined with the output/input end rotation shaft (S1011) of the first rotary kinetic power source (P1);

The rotation shaft (S102) combined with the output wheel (W102) of the epicyclic gear set (EG101) is combined with the output/input end rotation shaft (S1024) of the second rotary kinetic power source (P2), and the output/input end rotation shaft (S1025) at the other end of the second rotary kinetic power source (P2) is combined with the rotation shaft (S1026);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing between the rotation shaft (S101) and the rotation shaft (S102) are enabled to be controlled, so as to further control the operation relation between the first rotary kinetic power source (P1), the second rotary kinetic power source (P2) and the rotation shaft (S1026); for example controlling one or both of the first rotary kinetic power source (P1) and the second rotary kinetic power source (P2) to drive the rotation shaft (S1026).

Figure 3:
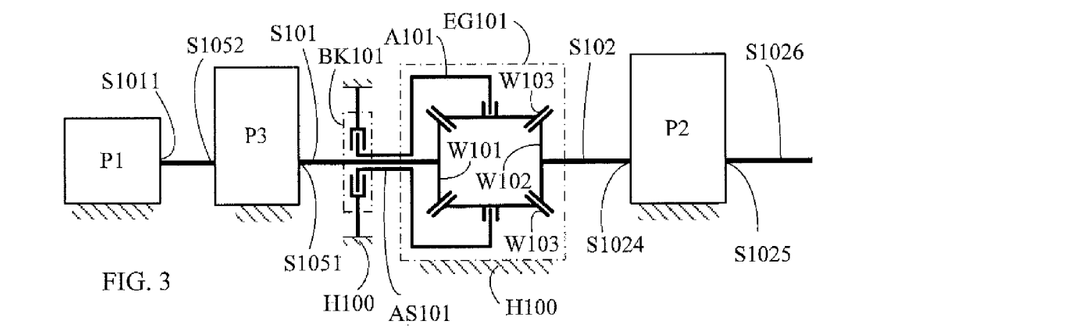
FIG. 3 is a schematic view showing a third rotary kinetic power source (P3) being installed between the first rotary kinetic power source (P1) and the controllable brake device (BK101) shown in FIG. 1, according to one embodiment of the present invention.

FIG. 3 is a schematic view showing a third rotary kinetic power source (P3) being installed between the first rotary kinetic power source (P1) and the controllable brake device (BK101) shown in FIG. 1, according to one embodiment of the present invention.

As shown in FIG. 3, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Third rotary kinetic power source (P3): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

The other end of the rotation shaft (S101) combined with the input wheel (W101) of the epicyclic gear set (EG101) is combined to the output/input end rotation shaft (S1051) of the third rotary kinetic power source (P3);

The rotation shaft (S102) combined with the output wheel (W102) of the epicyclic gear set (EG101) is combined with the output/input end rotation shaft (S1024) of the second rotary kinetic power source (P2), and the output/input end rotation shaft (S1025) at the other end of the second rotary kinetic power source (P2) is combined with the rotation shaft (S1026) for being served as an output/input end;

The output/input end rotation shaft (S1011) of the first rotary kinetic power source (P1) is combined with the output/input end rotation shaft (S1052) of the third rotary kinetic power source (P3), and the other output/input end rotation shaft (S1051) of the third rotary kinetic power source (P3) is combined with the rotation shaft (S101) combined with the input wheel (W101) of the epicyclic gear set (EG101);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing functions between the rotation shaft (S101) and the rotation shaft (S102) are enabled to be controlled, so as to further control the operation relation between the first rotary kinetic power source (P1), the second rotary kinetic power source (P2), the third rotary kinetic power source (P3) and the rotation shaft (S1026); for example controlling one or both of the first rotary kinetic power source (P1) and the second rotary kinetic power source (P2) to drive the rotation shaft (S1026), or the first rotary kinetic power source (P1) drives the third rotary kinetic power source (P3) to operate as the power generator function, or the third rotary kinetic power source (P3) is operated as the motor function to actuate and drive the first rotary kinetic power source (P1).

Figure 4:
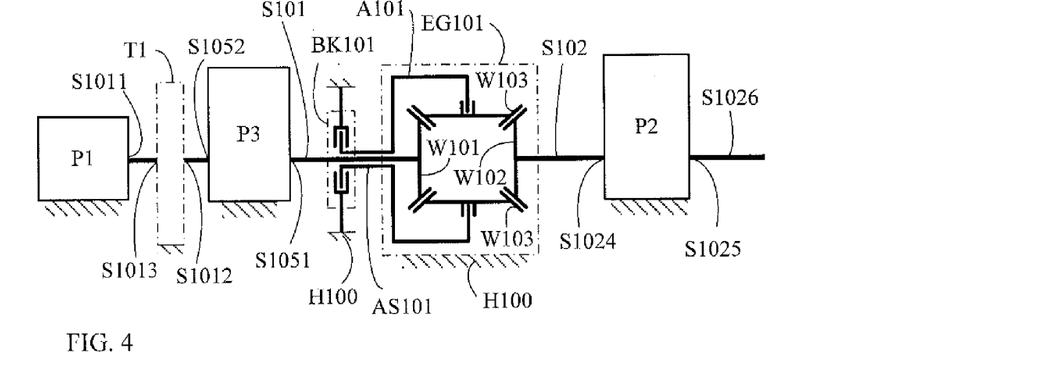
FIG. 4 is a schematic view showing a third rotary kinetic power source (P3) being installed between the first transmission device (T1) and the controllable brake device (BK101) shown in FIG. 2, according to one embodiment of the present invention.

FIG. 4 is a schematic view showing a third rotary kinetic power source (P3) being installed between the first transmission device (T1) and the controllable brake device (BK101) shown in FIG. 2, according to one embodiment of the present invention.

As shown in FIG. 4, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Third rotary kinetic power source (P3): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

First transmission device (T1): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

The other end of the rotation shaft (S101) combined with the input wheel (W101) of the epicyclic gear set (EG101) is combined to the output/input end rotation shaft (S1051) of the third rotary kinetic power source (P3), the other output/input end rotation shaft (S1052) of the third rotary kinetic power source (P3) is combined with the output/input end rotation shaft (S1012) of the first transmission device (T1), and the other output/input end rotation shaft (S1013) of the first transmission device (T1) is combined with the output/input end rotation shaft (S1011) of the first rotary kinetic power source (P1);

The rotation shaft (S102) combined with the output wheel (W102) of the epicyclic gear set (EG101) is combined with the output/input end rotation shaft (S1024) of the second rotary kinetic power source (P2), and the other output/input end rotation shaft (S1025) of the second rotary kinetic power source (P2) is combined with the rotation shaft (S1026) for being served as the output/input end;

The output/input end rotation shaft (S1011) of the first rotary kinetic power source (P1) is combined with the output/input end rotation shaft (S1013) of the first transmission device (T1), the other output/input end rotation shaft (S1012) of the first transmission device (T1) is combined with the output/input end rotation shaft (S1052) of the third rotary kinetic power source (P3), and the other output/input end rotation shaft (S1051) of the third rotary kinetic power source (P3) is combined with rotation shaft (S101) combined with the input wheel (W101) of the epicyclic gear set (EG101);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) or the rocker arm (A101) is combined to an action side of the controllable brake device (BK101), the other action side of the controllable brake device (BK101) is fixed in a housing (H100), and through controlling the controllable brake device (BK101) to perform brake locking or releasing, the operations of connecting for transmission or releasing functions between the rotation shaft (S101) and the rotation shaft (S102) are enabled to be controlled, so as to further control the operation relation between the first rotary kinetic power source (P1), the second rotary kinetic power source (P2), the third rotary kinetic power source (P3) and the rotation shaft (S1026); for example controlling one or both of the first rotary kinetic power source (P1) and the second rotary kinetic power source (P2) to drive the rotation shaft (S1026), or the first rotary kinetic power source (P1) drives the third rotary kinetic power source (P3) to operate as the power generator function, or the third rotary kinetic power source (P3) is operated as the motor function to actuate and drive the first rotary kinetic power source (P1).

Figure 5:
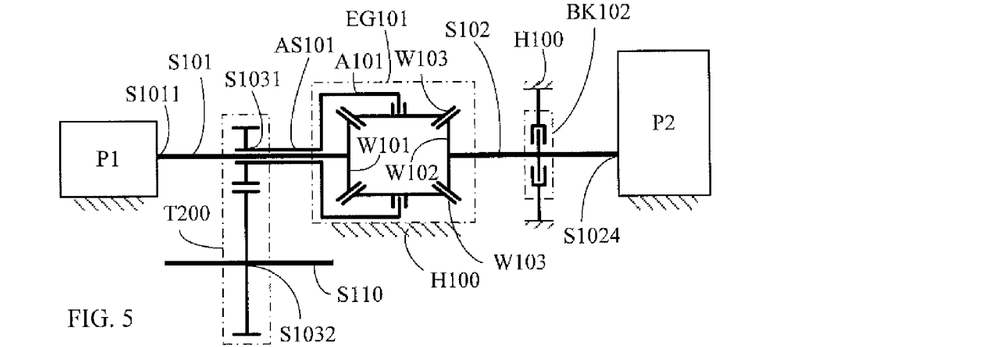

FIG. 5 is a schematic structural view showing the present invention being structured by the first rotary kinetic power source (P1) and a transmission unit (T200) and the epicyclic gear set (EG101) and a controllable brake device (BK102), and the output wheel (W102) of the epicyclic gear set (EG101) and the output/input end of the rotation shaft (S102) being combined with the second rotary kinetic power source (P2), the epicyclic wheel (W103) of the epicyclic gear set (EG101) being provided for driving the rocker arm (A101) and the sleeve type rotation shaft (AS101), and the sleeve type rotation shaft (AS101) being provided for driving the output/input end rotation shaft (S1031) of the transmission unit (T200), and the other output/input end rotation shaft (S1032) of the transmission unit (T200) being installed with a rotation shaft (S110), according to one embodiment of the present invention.

As shown in FIG. 5, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Transmission unit (T200): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1011) of the first rotary kinetic power source (P1), the other end of the rotation shaft (S101) is combined with the input wheel (W101) of the epicyclic gear set (EG101), the output/input end rotation shaft (S102) combined with the output wheel (W102) of the epicyclic gear set (EG101) is combined with the controllable brake device (BK102) and combined with the second rotary kinetic power source (P2), and the epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), and the sleeve type rotation shaft (AS101) is provided for driving the output/input end rotation shaft (S1031) of the transmission unit (T200), the other output/input end rotation shaft (S1032) of the transmission unit (T200) is provided for driving the output/input end rotation shaft (S110);

Through controlling the controllable brake device (BK102) to perform brake locking or releasing, the operations of connecting for transmission or releasing functions between the rotation shaft (S101) and the sleeve type rotation shaft (AS101) are enabled to be controlled, so as to further control the operation relation between the first rotary kinetic power source (P1), the second rotary kinetic power source (P2) and the rotation shaft (S110); for example controlling one or both of the first rotary kinetic power source (P1) and the second rotary kinetic power source (P2) to drive the rotation shaft (S110).

Figure 6:
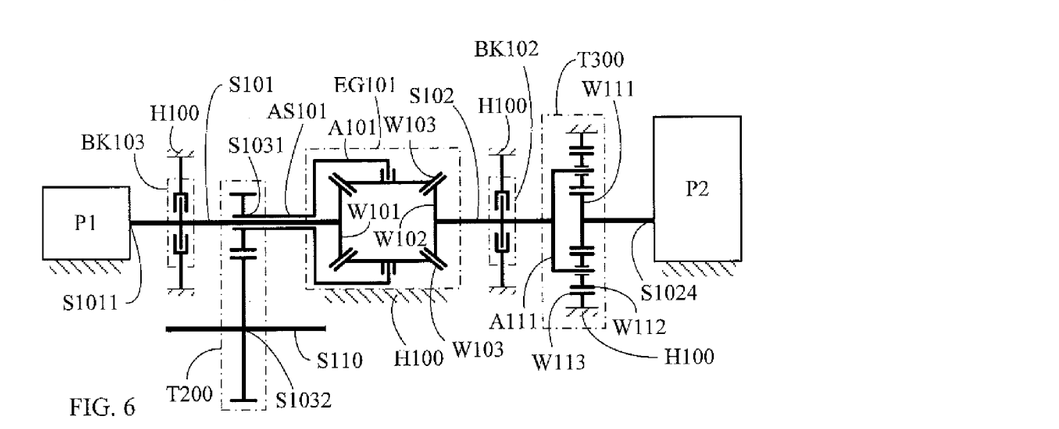

FIG. 6 is a schematic view showing the structure in FIG. 5 in which the input wheel (W101) of the epicyclic gear set (EG101) being combined with the rotation shaft (S101) and combined with the rotation shaft (S1011) of the first rotary kinetic power source (P1), the rotation shaft (S101) being combined to an action side of a controllable brake device (BK103), and the other action end of the controllable brake device (BK103) being fixed in the housing (H100), a planetary gear set (300) being installed between the rotation shaft (S102) combined with the output wheel (W102) of the epicyclic gear set (EG101) and the second rotary kinetic power source (P2), the output/input end of the rotation shaft (S102) combined with the output wheel (W102) of the epicyclic gear set (EG101) being combined with a rocker arm (A111) of a planetary gear set (T300), an outer annular wheel (W113) of the planetary gear set (T300) being fixed in the housing (H100), a sun wheel (W111) of the planetary gear set (T300) being combined with the second rotary kinetic power source (P2), the epicyclic wheel (W103) of the epicyclic gear set (EG101) being provided for driving the rocker arm (A101) and the sleeve type rotation shaft (AS101), and the sleeve type rotation shaft (AS101) being provided for driving the output/input end rotation shaft (S1031) of the transmission unit (T200), according to one embodiment of the present invention.

As shown in FIG. 6, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Transmission unit (T200): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

Planetary gear set (T300): constituted by a sun wheel (W111), a planetary wheel (W112), an outer annular wheel (W113) composed of friction wheels or gears, and a shell fixed in the housing (H100), wherein the outer annular wheel (W113) is fixed in the shell then fixed in the housing or directly fixed in the housing, the planetary wheel (W112) is combined with the rocker arm (A111) and combined with the rotation shaft (S102), and the sun wheel (W111) is combined with the output/input end rotation shaft (S1024) of the second rotary kinetic power source (P2);

The output/input end rotation shaft (S102) combined with the output wheel (W102) of the epicyclic gear set (EG101) is combined to an action side of the controllable brake device (BK102), the other action side of the controllable brake device (BK102) is fixed in the housing (H100), and the other end of the rotation shaft (S102) is combined with the rocker arm (A111) driven by the planetary wheel (W112) of the planetary gear set (T300);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101) and is provided for driving the output/input end rotation shaft (S1031) of the transmission unit (T200), and the other output/input end rotation shaft (S1032) of the transmission unit (T200) is provided for driving the rotation shaft (S110);

The output/input end rotation shaft (S1011) of the first rotary kinetic power source (P1) is combined with the rotation shaft (S101), the rotation shaft (S101) is combined with the input wheel (W101) of the epicyclic gear set (EG101), as well as connected to an action side of the controllable brake device (BK103), and the other action side of the controllable brake device (BK103) is fixed in the housing (H100);

Through controlling one or both of the controllable brake device (BK102) and the controllable brake device (BK103) to perform brake locking or releasing, the operation relation between the first rotary kinetic power source (P1), the second rotary kinetic power source (P2) and the rotation shaft (S110) is enabled to be controlled; for example controlling the operations of connecting for transmission or releasing functions between the rotation shaft (S101) and the sleeve type rotation shaft (AS101) or between the rotation shaft (S102) and the sleeve type rotation shaft (AS101), one or both of the first rotary kinetic power source (P1) and the second rotary kinetic power source (P2) is further controlled to drive the rotation shaft (S110).

Figure 7:
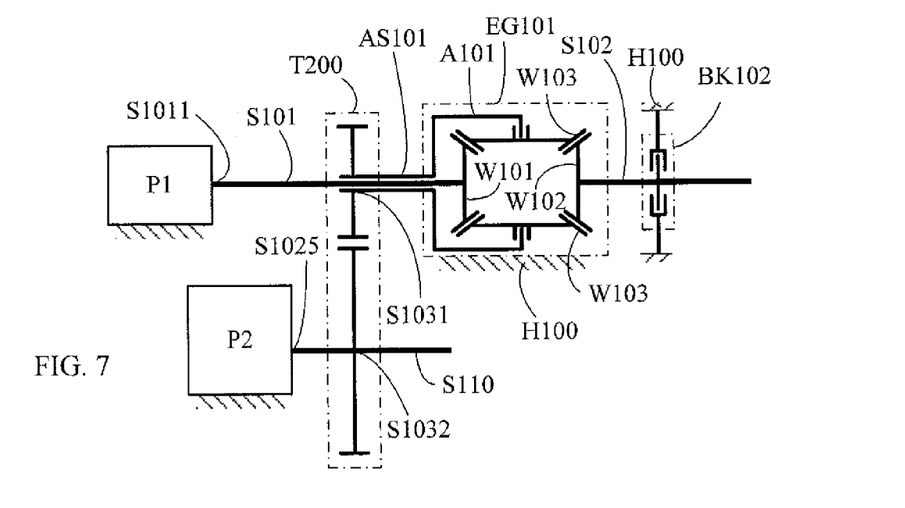
FIG. 7 is a schematic view showing the second rotary kinetic power source (P2) shown in FIG. 5 being installed at one end of the output/input end rotation shaft (S110) of the transmission unit (T200).

FIG. 7 is a schematic view showing the second rotary kinetic power source (P2) shown in FIG. 5 being installed at one end of the output/input end rotation shaft (S110) of the transmission unit (T200).

As shown in FIG. 7, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Transmission unit (T200): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1011) of the first rotary kinetic power source (P1), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) is provided for driving the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S1025) of the second rotary kinetic power source (P2), and the other end of the rotation shaft (S110) is served as an output/input end;

Through controlling the controllable brake device (BK102) to perform brake locking or releasing, the operations of connecting for transmission or releasing between the rotation shaft (S101) and the sleeve type rotation shaft (AS101) are enabled to be controlled, so as to further control the operation relation between the first rotary kinetic power source (P1), the second rotary kinetic power source (P2) and the rotation shaft (S110); for example controlling one or both of the first rotary kinetic power source (P1) and the second rotary kinetic power source (P2) to drive the rotation shaft (S110).

Figure 8:
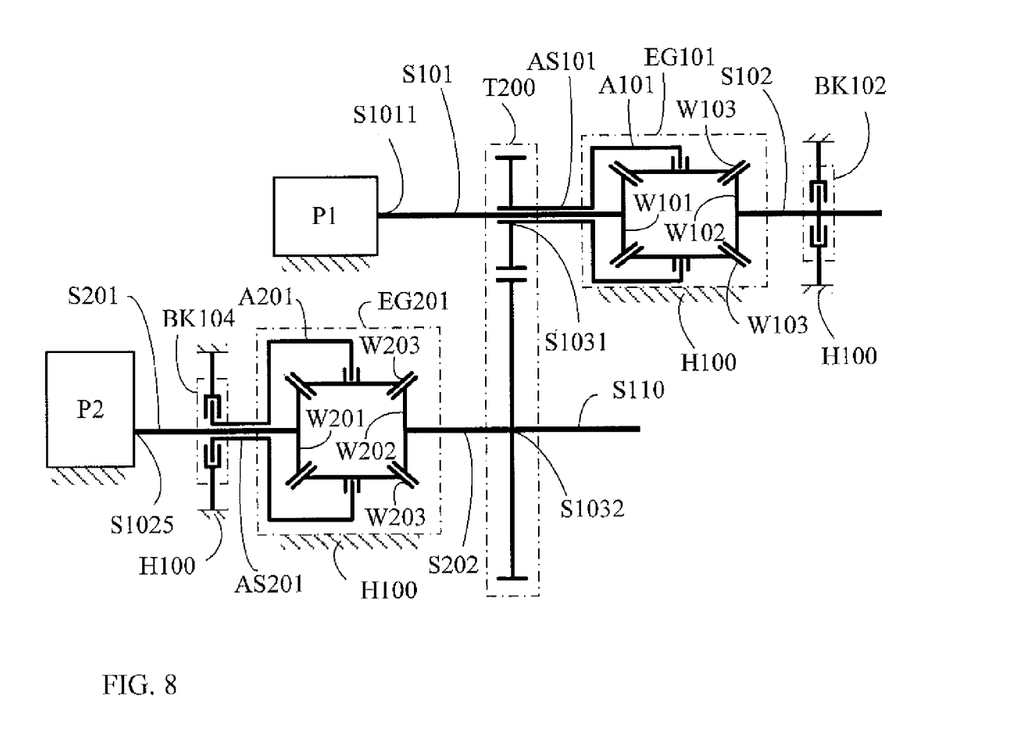
FIG. 8 is a schematic view showing the structure shown in FIG. 7 in which an epicyclic gear set (EG201) and a controllable brake device (BK104) being installed between one end of the output/input end rotation shaft (S110) of the transmission unit (T200) and the second rotary kinetic power source (P2).

FIG. 8 is a schematic view showing the structure shown in FIG. 7 in which an epicyclic gear set (EG201) and a controllable brake device (BK104) being installed between one end of the output/input end rotation shaft (S110) of the transmission unit (T200) and the second rotary kinetic power source (P2).

As shown in FIG. 8, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Epicyclic gear set (EG201): constituted by an input wheel (W201) and an output wheel (W202) and at least an epicyclic wheel (W203), and including through bevel gears engaging with each other, or through bevel friction wheels mutually performing friction transmissions to form an epicyclic gear set function, and structured by the rotation shaft (S201), the rotation shaft (S202), the rocker arm (A201), the sleeve type rotation shaft (AS201) and a bearing, and installed with a shell for being combined with the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK104): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS201) or the rocker arm (A201), and the other action side is fixed in the housing (H100);

Transmission unit (T200): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1011) of the first rotary kinetic power source (P1), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) is provided for driving the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S202) combined with the output wheel (W202) of the epicyclic gear set (EG201), the other output/input end rotation shaft (S201) combined with the input wheel (W201) of the epicyclic gear set (EG201) is combined with the output/input end rotation shaft (S1025) of the second rotary kinetic power source (P2), and the epicyclic wheel (W203) of the epicyclic gear set (EG201) is provided for driving the rocker arm (A201) and the sleeve type rotation shaft (AS201), the sleeve type rotate shaft (AS201) is capable of rotating on the rotation shaft (S201) and is provided for connecting to an action side of the controllable brake device (BK104), the other action side of the controllable brake device (BK104) is fixed in the housing (H100), and the other end of the rotation shaft (S110) is served as an output/input end;

Through controlling one or both of the controllable brake device (BK102) and the controllable brake device (BK104) to perform brake locking or releasing, the operation relation between the first rotary kinetic power source (P1), the second rotary kinetic power source (P2) and the rotation shaft (S110) is enabled to be controlled; for example controlling the operations of connecting for transmission or releasing functions between the rotation shaft (S101) and the sleeve type rotation shaft (AS101) or between the rotation shaft (S201) and the rotation shaft (S202), one or both of the first rotary kinetic power source (P1) and the second rotary kinetic power source (P2) is controlled to drive the rotation shaft (S110).

Figure 9:
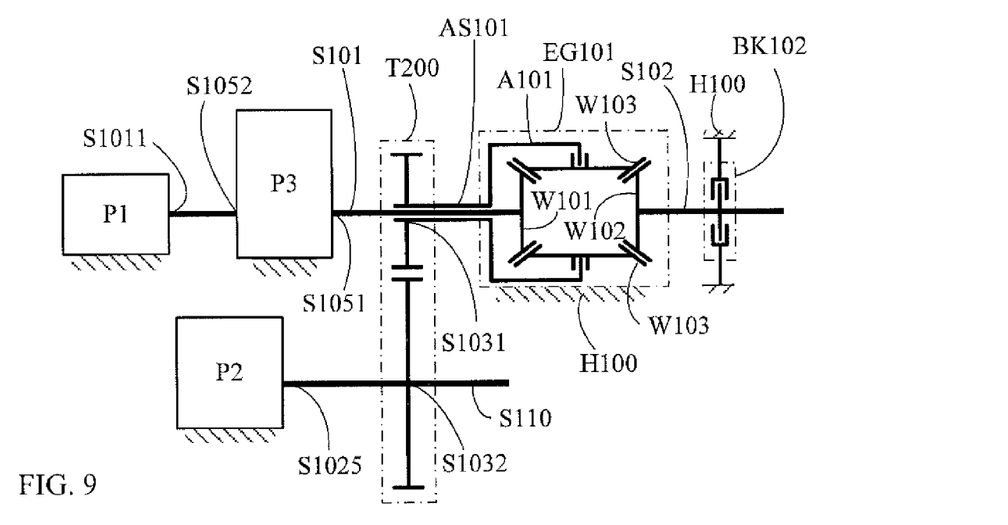
FIG. 9 is a schematic view showing the structure shown in FIG. 7 in which the third rotary kinetic power source (P3) being installed between the first rotary kinetic power source (P1) and the rotation shaft (S101) combined with the input wheel (W101) of the epicyclic gear set (EG101).

FIG. 9 is a schematic view showing the structure shown in FIG. 7 in which the third rotary kinetic power source (P3) being installed between the first rotary kinetic power source (P1) and the rotation shaft (S101) combined with the input wheel (W101) of the epicyclic gear set (EG101).

As shown in FIG. 9, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Third rotary kinetic power source (P3): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Transmission unit (T200): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1051) of the third rotary kinetic power source (P3), the rotation shaft (S1052) at the other end of the third rotary kinetic power source (P3) is combined with the output/input end rotation shaft (S1011) of the first rotary kinetic power source (P1), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) is provided for driving the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S1025) of the second rotary kinetic power source (P2), and the other end of the rotation shaft (S110) is served as an output/input end;

The rotation shaft (S101) combined with the input wheel (W101) of the epicyclic gear set (EG101) is combined with the output/input end rotation shaft (S1051) of the third rotary kinetic power source (P3), and the other output/input end rotation shaft (S1052) of the third rotary kinetic power source (P3) is combined with the output/input end rotation shaft (S1011) of the first rotary kinetic power source (P1);

Through controlling the controllable brake device (BK102) to perform brake locking or releasing, the operations of connecting for transmission or releasing functions between the rotation shaft (S101) and the sleeve type rotation shaft (AS101) are enabled to be controlled, so as to further control the operation relation between the first rotary kinetic power source (P1), the second rotary kinetic power source (P2), the third rotary kinetic power source (P3) and the rotation shaft (S110); for example controlling one or both of the first rotary kinetic power source (P1) and the second rotary kinetic power source (P2) to drive the rotation shaft (S110), or the first rotary kinetic power source (P1) drives the third rotary kinetic power source (P3) to operate as the power generator function, or the third rotary kinetic power source (P3) is operated as the motor function to actuate and drive the first rotary kinetic power source (P1).

Figure 10:
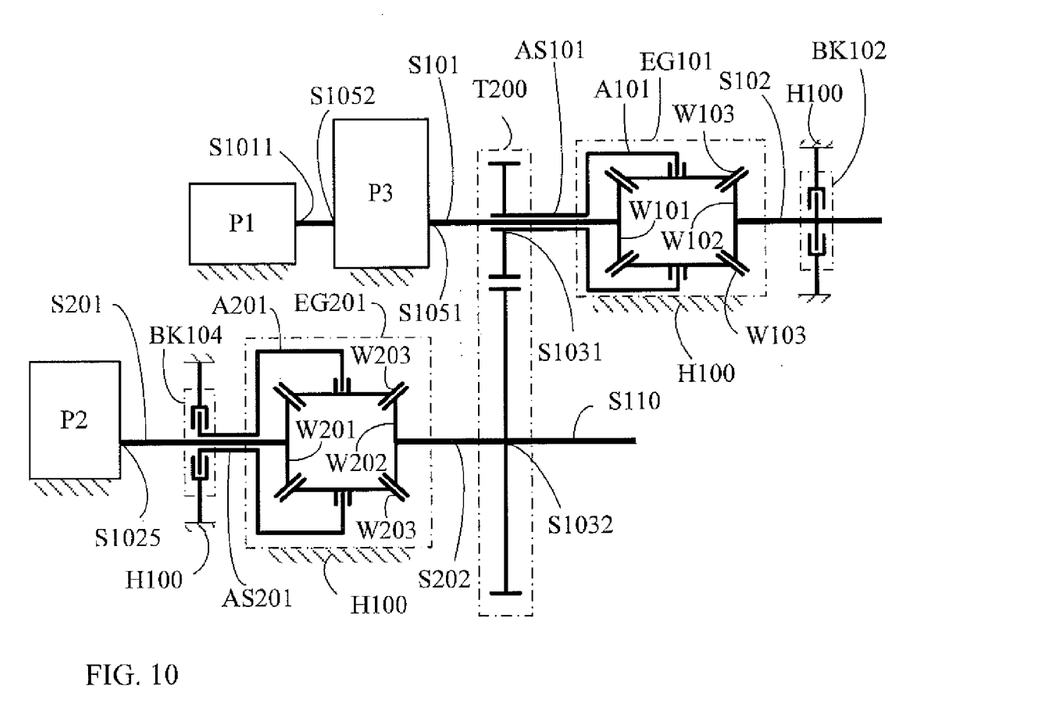
FIG. 10 is a schematic view showing the structure shown in FIG. 9 in which the epicyclic gear set (EG201) and the controllable brake device (BK104) being installed between one end of the output/input end rotation shaft (S110) of the transmission unit (T200) and the second rotary kinetic power source (P2).

FIG. 10 is a schematic view showing the structure shown in FIG. 9 in which the epicyclic gear set (EG201) and the controllable brake device (BK104) being installed between one end of the output/input end rotation shaft (S110) of the transmission unit (T200) and the second rotary kinetic power source (P2).

As shown in FIG. 10, it mainly consists of:

First rotary kinetic power source (P1): constituted by one or more than of one of rotary kinetic power sources capable of generating the rotary kinetic power output, including an internal combustion engine, external combustion engine, Sterling engine, turbine engine, wind-driven blade power set, flow-driven power set, or manual power;

Second rotary kinetic power source (P2): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Third rotary kinetic power source (P3): constituted by a rotational electric machine, or constituted by a rotational electric machine combined with a transmission unit, mainly having the motor function for converting the input electric power into the rotary mechanical kinetic energy, as well as having the power generator function for reversely inputting rotary kinetic energy;

Epicyclic gear set (EG101): constituted by an input wheel (W101) and an output wheel (W102) and at least an epicyclic wheel (W103), and including through bevel gears engaging with each other, or through bevel friction wheels mutually performing friction transmissions to form an epicyclic gear set function, and structured by the rotation shaft (S101), the rotation shaft (S102), the rocker arm (A101), the sleeve type rotation shaft (AS101) and a bearing, and installed with a shell for being combined with the housing (H100);

Epicyclic gear set (EG201): constituted by an input wheel (W201) and an output wheel (W202) and at least an epicyclic wheel (W203), and including through bevel gears engaging with each other, or through bevel friction wheels mutually performing friction transmissions to form an epicyclic gear set function, and structured by the rotation shaft (S201), the rotation shaft (S202), the rocker arm (A201), the sleeve type rotation shaft (AS201) and a bearing, and installed with a shell for being combined with the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK104): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS201) or the rocker arm (A201), and the other action side is fixed in the housing (H100);

Transmission unit (T200): constituted by the automatic, manumatic, semi-automatic, or manual gear shifting device with fixed or variable speed ratios which is further structured by a transmission gear set composed of gears, friction wheels, pulleys and pulley belts, chains and chain wheels, or a planetary type transmission gear set, or an epicyclic type transmission gear set, the CVT, or the hydraulic transmission device;

One end of the rotation shaft (S101) is combined with the output/input end rotation shaft (S1051) of the third rotary kinetic power source (P3), the rotation shaft (S1052) at the other end of the third rotary kinetic power source (P3) is combined with the output/input end rotation shaft (S1011) of the first rotary kinetic power source (P1), the other end of the rotation shaft (S101) is combined with the input wheel (W101) of the epicyclic gear set (EG101), the output/input end rotation shaft (S102) combined with the output wheel (W102) of the epicyclic gear set (EG101) is combined to an action side of the controllable brake device (BK102), and the other action side of the controllable brake device (BK102) is fixed in the housing (H100);

The epicyclic wheel (W103) of the epicyclic gear set (EG101) is combined with the rocker arm (A101) and combined with the sleeve type rotation shaft (AS101), the sleeve type rotation shaft (AS101) rotates on the rotation shaft (S101), the sleeve type rotation shaft (AS101) is provided for driving the output/input end rotation shaft (S1031) of the transmission unit (T200), and the other output/input end rotation shaft (S1032) of the transmission unit (T200) is provided for driving the output/input end rotation shaft (S110);

One end of the rotation shaft (S110) is combined with the output/input end rotation shaft (S202) combined with the output wheel (W202) of the epicyclic gear set (EG201), the other output/input end rotation shaft (S201) combined with the input wheel (W201) of the epicyclic gear set (EG201) is combined with the output/input end rotation shaft (S1025) of the second rotary kinetic power source (P2), and the epicyclic wheel (W203) of the epicyclic gear set (EG201) is provided for driving the rocker arm (A201) and the sleeve type rotation shaft (AS201), the sleeve type rotate shaft (AS201) is capable of rotating on the rotation shaft (S201) and is provided being combined to an action side of the controllable brake device (BK104), the other action side of the controllable brake device (BK104) is fixed in the housing (H100), and the other end of the rotation shaft (S110) is served as an output/input end;

The rotation shaft (S101) combined with the input wheel (W101) of the epicyclic gear set (EG101) is combined with the output/input end rotation shaft (S1051) of the third rotary kinetic power source (P3), and the other output/input end rotation shaft (S1052) of the third rotary kinetic power source (P3) is combined with the output/input end rotation shaft (S1011) of the first rotary kinetic power source (P1);

Through controlling one or both of the controllable brake device (BK102) and the controllable brake device (BK104) to perform brake locking or releasing, the operation relation between the first rotary kinetic power source (P1), the second rotary kinetic power source (P2), the third rotary kinetic power source (P3) and the rotation shaft (S110) are able to be controlled; for example controlling the operations of connecting for transmission or releasing functions between the rotation shaft (S101) and the sleeve type rotation shaft (AS101) or between the rotation shaft (S201) and the rotation shaft (S202), one or both of the first rotary kinetic power source (P1) and the second rotary kinetic power source (P2) is controlled to drive the rotation shaft (S110), or the first rotary kinetic power source (P1) drives the third rotary kinetic power source (P3) to operate as the power generator function, or the third rotary kinetic power source (P3) is operated as the motor function to actuate and drive the first rotary kinetic power source (P1).

The invention claimed is:

1. A controllable epicyclic clutch device coupled with a hybrid power train, comprising:
a first rotary kinetic power source (P1) constituted by at least one of an internal combustion engine, an external combustion engine, a Sterling engine, a turbine engine, a wind-driven blade power set, a flow-driven power set, and a manually driven device, and having an input/output end rotation shaft (S1011);
a second rotary kinetic power source (P2) constituted by at least one of a rotary electric machine and a rotary electric machine with a transmission unit, the rotary electric machine converting input electric power into rotary mechanical kinetic energy and rotary mechanical kinetic energy into electric power, and having at least one of a first input/output end rotation shaft (S1024) and a second input/output end rotation shaft (S1025);
an epicyclic gear set (EG101) including at least one epicyclic wheel (W103), an input wheel (W101), and an output wheel (W102), wherein said at least one epicyclic wheel (W103), input wheel (W101), and output wheel (W102) are bevel gears or bevel friction wheels, said at least one epicyclic wheel engaging both said input wheel (W101) and output wheel (W102);
a first rotation shaft (S101) having a first end connected to and rotatable with said input wheel (W101) and a second end directly or indirectly coupled with the input/output end rotation shaft (S1011) of the first rotary kinetic power source (P1);
a second rotation shaft (S102) having a first end connected to and rotatable with said output wheel (W102);
a rocker arm (A101) on which said epicyclic wheel (W103) is rotatably mounted;
a sleeve type rotation shaft (AS101) extending from the rocker arm (A101), said first rotation shaft (S101) extending through and rotatable relative to the sleeve type rotation shaft (AS101);
a transmission unit (T200) connected to the sleeve type rotation shaft (AS101) and having a transmission wheel (S1032);
a second input/output shaft (S110) combined with the transmission wheel (S1032) of a transmission unit (T200);
a controllable brake device (BK102 or BK103) having a first side fixed to a housing (H100), wherein a second side of the controllable brake device is connected to engage or release one of the second rotation shaft (S102) or the first rotation shaft (S101), thereby locking or releasing said second rotation shaft (S102) or said first rotation shaft (S101) to selectively enable one or both of the first rotary kinetic power source (P1) and the second rotary kinetic power source (P2) to drive the first rotation shaft (S101), the second rotation shaft (S102), or the second input/output shaft (S110), as follows:
when the controllable brake device (BK102) engages the second rotation shaft (S102), the first power source (P1) drives the second input/output shaft (S110),
when the controllable brake device (BK103) engages the first rotation shaft (S101), the second power source (P2) drives the second input/output shaft (S110), and
when neither the first rotation shaft (S101) nor the second rotation shaft (S102) is engaged by the controllable brake device (BK102,BK103):
the first power source (P1) is enabled to drive the second rotation shaft (S102), such that rotation of the second rotation shaft (S102) causes the second power source (P2) to convert rotary mechanical kinetic energy into electric power,
the second power source (P2) is enabled to drive the first rotation shaft (S101) and the first power source (P1).

2. A controllable epicyclic clutch device coupled with a hybrid power train as claimed in claim 1, wherein the first input/output end rotation shaft (S1024) of the second rotary kinetic power source (P2) is combined with the second rotation shaft (S102), the transmission unit (T200) includes a second transmission wheel (S1031) connected to rotate with the sleeve type rotation shaft (AS101) and the transmission wheel (S1032) combined with the second input/output shaft (S110), and the controllable brake device (BK102) selectively engages or releases the second rotation shaft (S102), thereby locking or releasing the second rotation shaft (S102) to selectively enable the first rotary kinetic power source (P1) to drive the second rotary kinetic power source (P2), to enable the second rotary kinetic power source (P2) to drive the first rotary kinetic power source (P1), to enable one or both of the first rotary kinetic power source (P1) and the second rotary kinetic power source (P2) to drive the second input/output shaft (S110), and/or to enable the second input/output shaft (S110) to drive one or both of the first rotary kinetic power source (P1) and the second rotary kinetic power source (P2).

3. A controllable epicyclic clutch device coupled with a hybrid power train as claimed in claim 1, further comprising a planetary gear set (T300) having a sun wheel (W111)

combined with the first input/output end rotation shaft (S1024) of the second rotary kinetic power source (P2) and at least one planetary wheel (W112) rotatably mounted on a planetary rocker arm (A111) combined with the second rotation shaft (S102), wherein the transmission unit (T200) includes a second transmission wheel (S1031) connected to rotate with the sleeve type rotation shaft (AS101) and the transmission wheel (S1032) combined with the second input/output shaft (S110), and one said controllable brake device (BK103) selectively engages or releases the first rotation shaft (S101), a second said controllable brake device (BK102) selectively engages or releases the second rotation shaft (S102), wherein control of said controllable brake devices (BK102 and BK103) selectively enables the first rotary kinetic power source (P1) to drive the second rotary kinetic power source (P2), the second rotary kinetic power source (P2) to drive the first rotary kinetic power source (P1), one or both of the first rotary kinetic power source (P1) and the second rotary kinetic power source (P2) to drive the second input/output shaft (S110), and/or the second input/output shaft (S110) to drive one or both of the first rotary kinetic power source (P1) and the second rotary kinetic power source (P2).

4. A controllable epicyclic clutch device coupled with a hybrid power train as claimed in claim 1, wherein the transmission unit (T200) includes a second transmission wheel (S1031) connected to rotate with the sleeve type rotation shaft (AS101) and the transmission wheel (S1032) combined with the second input/output shaft (S110), the second input/output end rotation shaft (S1025) of the second rotary kinetic power source (P2) is directly or indirectly coupled with the transmission wheel (S1032), and the controllable brake device (BK102) selectively engages or releases the second rotation shaft (S102), thereby locking or releasing the second rotation shaft (S102) to selectively enable the first rotary kinetic power source (P1) to drive the second rotary kinetic power source (P2), to enable the second rotary kinetic power source (P2) to drive the first rotary kinetic power source (P1), to enable one or both of the first rotary kinetic power source (P1) and the second rotary kinetic power source (P2) to drive the second input/output shaft (S110), and/or to enable the second input/output shaft (S110) to drive one or both of the first rotary kinetic power source (P1) and the second rotary kinetic power source (P2).

5. A controllable epicyclic clutch device coupled with a hybrid power train as claimed in claim 4, wherein the second input/output end rotation shaft (S1025) of the second rotary kinetic power source (P2) is coupled to the transmission wheel (S1032) through a second epicyclic gear set (EG201), said second epicyclic gear set (EG201) including:
at least one second epicyclic wheel (W203) rotatably mounted on a second rocker arm (A201), a second input wheel (W201) connected to and rotatable with a third rotation shaft (S201) rotatably connected to the second rotary kinetic power source (P2), and a second output wheel (W202) rotatably connected to the external output/input shaft (S110) or the second transmission unit (T200), wherein said at least one second epicyclic wheel (W203), second input wheel (W201), and second output wheel (W202) are bevel gears or bevel friction wheels, said at least one second epicyclic wheel engaging both said second input wheel (W201) and second output wheel (W202); and
a second controllable brake device (BK104) having one end fixed to the housing (H100) and another end arranged to selectively release and engage one of said second rocker arm (A201) and thereby control transmission of power between the second rotary kinetic power source (P2), the transmission wheel (S1032) of the transmission unit (T200), and the second input/output shaft (S110).

6. A controllable epicyclic clutch device coupled with a hybrid power train as claimed in claim 5, further comprising a third rotary kinetic power source (P3) constituted by at least one of a rotary electric machine and a rotary electric machine with a transmission unit, the rotary electric machine converting input electric power into rotary mechanical kinetic energy and rotary mechanical kinetic energy into electric power, and having a first side input/output rotation shaft (S1051) and a second side input/output rotation shaft (S1052), the first side input/output rotation shaft (S1051) being connected to the first rotation shaft (S101) and the second side input/output rotation shaft (S1052) being connected to the input/output end rotation shaft (S1011) of the first rotary kinetic energy power source (P1), wherein respective locking or releasing of said second rotation shaft (S102) by the controllable brake device (BK102) and selectively locking or releasing of the input rotation shaft (S201) by the second controllable brake device (BK104) selectively enables the first rotary kinetic power source (P1) and/or the second rotary kinetic power source (P2) to drive the third rotary kinetic power source (P3) to operate as a generator, to enable the third rotary kinetic power source (P3) to operate as a motor to drive the first rotary kinetic power source (P1) and/or the second rotary kinetic power source (P2), and/or to enable any combination of the first rotary kinetic power source (P1), the third rotary kinetic power source (P3), and the second rotary kinetic power source (P2) to drive the second input/output shaft (S110).

7. A controllable epicyclic clutch device coupled with a hybrid power train as claimed in claim 4, further comprising a third rotary kinetic power source (P3) constituted by at least one of a rotary electric machine and a rotary electric machine with a transmission unit, the rotary electric machine converting input electric power into rotary mechanical kinetic energy and rotary mechanical kinetic energy into electric power, and having a first side input/output rotation shaft (S1051) and a second side input/output rotation shaft (S1052), the first side input/output rotation shaft (S1051) being connected to the first rotation shaft (S101) and the second side input/output rotation shaft (S1052) being connected to the input/output end rotation shaft (S1011) of the first rotary kinetic energy power source (P1), wherein respective locking or releasing of said second rotation shaft (S102) by the controllable brake device (BK102) selectively enables the first rotary kinetic power source (P1) and/or the second rotary kinetic power source (P2) to drive the third rotary kinetic power source (P3) to operate as a generator, to enable the third rotary kinetic power source (P3) to operate as a motor to drive the first rotary kinetic power source (P1) and/or the second rotary kinetic power source (P2), and/or to enable any combination of the first rotary kinetic power source (P1), the third rotary kinetic power source (P3), and the second rotary kinetic power source (P2) to drive the second input/output shaft (S110).

* * * * *